United States Patent
Karjala et al.

(10) Patent No.: US 10,167,383 B2
(45) Date of Patent: Jan. 1, 2019

(54) PROCESS TO FORM ETHYLENE/ALPHA-OLEFIN INTERPOLYMERS

(71) Applicant: Dow Global Technologies LLC, Midland, TX (US)

(72) Inventors: Thomas W. Karjala, Lake Jackson, TX (US); Jorge Rubalcaba, Pearland, TX (US); Edward O. Madenjian, Lake Jackson, TX (US); Curvel Hypolite, Rosharon, TX (US); Pradeep Jain, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/525,553

(22) PCT Filed: Dec. 18, 2015

(86) PCT No.: PCT/US2015/066848
§ 371 (c)(1),
(2) Date: May 9, 2017

(87) PCT Pub. No.: WO2016/109264
PCT Pub. Date: Jul. 7, 2016

(65) Prior Publication Data
US 2018/0037727 A1     Feb. 8, 2018

Related U.S. Application Data

(60) Provisional application No. 62/097,268, filed on Dec. 29, 2014.

(51) Int. Cl.
    *C08L 23/08*     (2006.01)
    *B01J 19/18*     (2006.01)
    *B01J 19/24*     (2006.01)

(52) U.S. Cl.
    CPC .......... *C08L 23/0815* (2013.01); *B01J 19/18* (2013.01); *B01J 19/2455* (2013.01); *C08L 2205/025* (2013.01); *C08L 2308/00* (2013.01)

(58) Field of Classification Search
CPC ............. C08L 23/0815; C08L 2308/00; C08L 2205/025; C08F 297/083
See application file for complete search history.

(56) References Cited

U.S. PATENT DOCUMENTS

| | | |
|---|---|---|
| 3,726,843 A | 4/1973 | Anolick et al. |
| 6,329,471 B1 | 12/2001 | Mizuide et al. |
| 6,329,477 B1 | 12/2001 | Harrington et al. |
| 6,545,088 B1 | 4/2003 | Kolthammer et al. |
| 6,686,419 B2 | 2/2004 | Wouters et al. |
| 7,122,606 B2 | 10/2006 | Tonti et al. |
| 7,220,806 B2 | 5/2007 | Gauthier et al. |
| 7,223,822 B2 | 5/2007 | Abhari et al. |
| 7,449,530 B2 | 11/2008 | Hagerty et al. |
| 7,910,637 B2 | 3/2011 | Kiss et al. |
| 8,088,867 B2 | 1/2012 | Jiang et al. |
| 8,143,352 B2 | 3/2012 | Kiss et al. |
| 8,178,625 B2 | 5/2012 | Ellul et al. |
| 8,431,657 B2 | 4/2013 | Wang et al. |
| 8,562,915 B2 | 10/2013 | Yeh et al. |
| 8,735,517 B2 | 5/2014 | Morgan et al. |
| 9,102,824 B2 | 8/2015 | Liang et al. |
| 2007/0004875 A1 | 1/2007 | Gray et al. |
| 2011/0174415 A1 | 7/2011 | Leskinen et al. |
| 2013/0341567 A1* | 12/2013 | Hyde ............... B01D 15/00 252/364 |
| 2015/0274867 A1 | 10/2015 | LiPiShan et al. |

FOREIGN PATENT DOCUMENTS

| | | |
|---|---|---|
| WO | 2008095807 A1 | 8/2008 |
| WO | WO 2008/095807 A1 * | 8/2008 |
| WO | 2013/096573 A1 | 6/2013 |
| WO | 2014/003857 A1 | 1/2014 |
| WO | 2016109265 A1 | 7/2016 |

OTHER PUBLICATIONS

Ravishankar, P.S. of Exxon (Rubber Chemistry and Technology, vol. 85, No. 3, pp. 327-349, 2012.
Ravishankar, P.S., Et. Al., Recent Advances in EPDM and Dynamically Vulcanized Thermoplastic Elastomers, 186th Technical Meeting of Rubber Division, Nashville, TN, Oct. 2014.
PCT/US2015/066848, International Search Report and Written Opinion dated Apr. 21, 2016.
PCT/US2015/066848, International Preliminary Report on Patentability dated Jul. 4, 2017.

* cited by examiner

*Primary Examiner* — Roberto Rabago
(74) *Attorney, Agent, or Firm* — Dinsmore & Shohl LLP

(57) ABSTRACT

The invention provides a process to form a "first composition comprising a first ethylene/α-olefin interpolymer and a second ethylene/α-olefin interpolymer," said process comprising polymerizing a first mixture comprising ethylene, an α-olefin, and optionally a polyene, in a stirred tank reactor to form a first ethylene/α-olefin interpolymer, and transferring at least some of the first ethylene/α-olefin interpolymer to a loop reactor, and polymerizing, therein, a second mixture comprising ethylene, an alpha-olefin, and optionally a polyene, in the presence of the first ethylene/α-olefin interpolymer, to form the "first composition comprising the first ethylene/α-olefin interpolymer and the second ethylene/α-olefin interpolymer." The invention also provides a polymerization reactor configuration comprising at least the following: a stirred tank reactor followed by a loop reactor.

11 Claims, 2 Drawing Sheets

PROCESS TO FORM ETHYLENE/ALPHA-OLEFIN INTERPOLYMERS

REFERENCE TO RELATED APPLICATIONS

The present application claims the benefit of U.S. Provisional Application No. 62/097,268, filed Dec. 29, 2014, and incorporated herein by reference.

BACKGROUND OF THE INVENTION

There is a need to polymerize high molecular weight ethylene/alpha-olefin interpolymers at reduced costs, while minimizing the load (solvent) on the devolatilization system of the polymerization and isolation process. Polymerization processes of the art are described in the following references: U.S. Pat. Nos. 7,910,637; 6,329,471; 8,143,352; 6,686,419; 7,223,822; 8,178,625; 6,329,477; 7,223,822; 7,122,606; 7,449,530; 7,220,806; 8,431,657; 8,735,517; 8,088,867; 8,562,915; 9,102,824; U.S. Provisional 62/097,257 (filed Dec. 29, 2014) and U.S. Publication 2007/0004875. However, as discussed above, there remains a need to prepare high molecular weight ethylene/alpha-olefin interpolymers at reduced costs, while minimizing the devolatilzation load (solvent) on the reactor system. These needs have been met by the following invention.

SUMMARY OF INVENTION

The invention provides a process to form a "first composition comprising a first ethylene/α-olefin interpolymer and a second ethylene/α-olefin interpolymer,"

said process comprising polymerizing a first mixture comprising ethylene, an α-olefin, and optionally a polyene, in a stirred tank reactor to form a first ethylene/α-olefin interpolymer, and transferring at least some of the first ethylene/α-olefin interpolymer to a loop reactor, and polymerizing, therein, a second mixture comprising ethylene, an alpha-olefin, and optionally a polyene, in the presence of the first ethylene/α-olefin interpolymer, to form the "first composition comprising the first ethylene/α-olefin interpolymer and the second ethylene/α-olefin interpolymer."

The invention also provides a polymerization reactor configuration comprising at least the following: a stirred tank reactor followed by a loop reactor.

DETAILED DESCRIPTION

Figure 1:
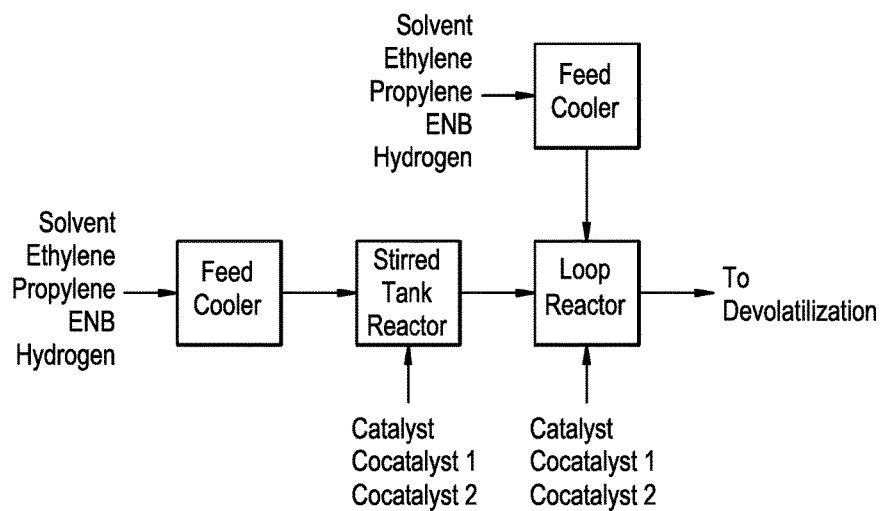
FIG. 1 depicts a polymerization scheme containing a CSTR-Loop reactor configuration.

It has been discovered that very high molecular weight, ethylene/alpha-olefin interpolymers, such as bimodal EPDM compositions, can be produced using an inventive polymerization process described herein. It has been discovered that a high molecular weight (for example, $Mw \geq 300,000$ g/mole) interpolymer can be produced in a lower cost stirred tank reactor (for example, a CSTR), and then transferred to a loop reactor. In the subsequent loop reactor, a lower molecular weight interpolymer can be produced, and the loop reactor can be used to increase the net polymer concentration, to reduce the load (solvent) on the devolatilization section of the polymer isolation process. It has also been discovered that this inventive polymerization process provides a first reactor "higher molecular weight capability," but requires less devolatilization capacity for a given production rate, as compared to conventional polymerization processes, including loop/loop processes.

As discussed above, in a first aspect, the invention provides a process to form a "first composition comprising a first ethylene/α-olefin interpolymer and a second ethylene/α-olefin interpolymer,"

said process comprising polymerizing a first mixture comprising ethylene, an α-olefin, and optionally a polyene, in a stirred tank reactor to form a first ethylene/α-olefin interpolymer, and transferring at least some of the first ethylene/α-olefin interpolymer to a loop reactor, and polymerizing, therein, a second mixture comprising ethylene, an alpha-olefin, and optionally a polyene, in the presence of the first ethylene/α-olefin interpolymer, to form the "first composition comprising the first ethylene/α-olefin interpolymer and the second ethylene/α-olefin interpolymer."

The invention also provides, in a second aspect, a polymerization reactor configuration comprising at least the following: a stirred tank reactor followed by a loop reactor.

An inventive process may comprise a combination of two or more embodiments as described herein.

An inventive reactor configuration may comprise a combination of two or more embodiments as described herein.

The first composition may comprise a combination of two or more embodiments as described herein.

The first ethylene/α-olefin interpolymer may comprise a combination of two or more embodiments as described herein.

The second ethylene/α-olefin interpolymer may comprise a combination of two or more embodiments as described herein.

In one embodiment, all of the first interpolymer is transferred to the loop reactor.

In one embodiment, greater than 90 wt %, further greater than 92 wt %, further greater than 95 wt %, further greater than 98 wt %, further greater than 99 wt % of the first interpolymer is transferred to the loop reactor.

Less than 1.0 wt %, further less than 0.5 wt %, further less than 0.2 wt % of the first interpolymer, transferred to the loop reactor, may react in the loop reactor (for example, by incorporation into the second interpolymer). For practical purposes, and as used herein, the properties (e.g., Mn, Mw, MWD, Mooney Viscosity) of the first interpolymer, formed in the stirred tank reactor, are equated to the properties of the first interpolymer of the first composition.

In one embodiment, the stirred tank reactor is a continuous stirred tank reactor (CSTR).

In one embodiment, the polymerization of the first mixture is a solution polymerization, and further a continuous solution polymerization.

In one embodiment, the solution viscosity of the first ethylene/α-olefin interpolymer in the first reactor is greater than, or equal to, 5,000 cP, at a temperature of the stirred tank reactor.

In one embodiment, the polymerization of the second mixture is a solution polymerization, and further a continuous solution polymerization. In a further embodiment, the ratio of "the solution viscosity of the first ethylene/α-olefin interpolymer in the stirred tank reactor at the temperature of the stirred tank reactor" to "the solution viscosity of the first composition in the loop reactor at the temperature of the loop reactor" is greater than, or equal to, 3.0.

In one embodiment, each polymerization, independently, takes place in the presence of a single site catalyst (for example, a bis-biphenylphenoxy type catalyst, a constrained geometry catalyst, or a bis-metallocene catalyst). In a further embodiment, each polymerization, independently, takes place in the presence of a bis-biphenylphenoxy type catalyst or a constrained geometry catalyst.

In one embodiment, the reactor temperature of the stirred tank reactor is from 80° C. to 130° C., further from 90° C. to 120° C., further from 100° C. to 110° C.

In one embodiment, the ratio of "the reactor temperature of the stirred tank reactor" to "the reactor temperature of the loop reactor" is from 0.50 to 1.00° C./° C., further from 0.60 to 1.00° C./° C., further from 0.70 to 1.00° C./° C.

In one embodiment, the reactor temperature of the loop reactor is from 110° C. to 190° C., further from 120° C. to 180° C., further from 130° C. to 170° C.

In one embodiment, the first ethylene/α-olefin interpolymer concentration in the stirred tank reactor is from 5.0 to 10.0 wt %, further from 5.5 to 10.0 wt %, further from 6.0 to 10.0 wt %, based on the total weight of the reactor content.

In one embodiment, the ratio of "the first interpolymer concentration in the stirred tank reactor" to "the first composition concentration in the loop reactor" is from 0.30 to 0.80 wt %/wt %, further from 0.40 to 0.70 wt %/wt %, further from 0.50 to 0.60 wt %/wt %.

In one embodiment, the first composition concentration in the loop reactor is from 5.0 to 30.0 wt %, further from 8.0 to 25.0 wt %, further from 10.0 to 20.0 wt %, based on the total weight of the reactor content.

In one embodiment, the stirred tank reactor is an adiabatic reactor.

In one embodiment, the process further comprises adding at least one oil to the first composition after it exits the loop reactor.

In one embodiment, the first ethylene/α-olefin interpolymer has a Mn from 120,000 to 300,000 g/mole, further from 130,000 to 270,000 g/mole, further from 140,000 to 250,000 g/mole.

In one embodiment, the difference ($Mn_{first}-Mn_{second}$) in the number average molecular weight ($Mn_{first}$) of the first interpolymer and the number average molecular weight ($Mn_{second}$) of the second interpolymer is greater than, or equal to, 80,000 g/mole, further greater than, or equal to, 90,000 g/mole, further greater than, or equal to, 100,000 g/mole, further greater than, or equal to, 110,000 g/mole, further greater than, or equal to, 120,000 g/mole, further greater than, or equal to, 130,000 g/mole, further greater than, or equal to, 140,000 g/mole, further greater than, or equal to, 150,000 g/mole.

In one embodiment, the difference ($Mn_{first}-Mn_{second}$) in the number average molecular weight ($Mn_{first}$) of the first interpolymer and the number average molecular weight ($Mn_{second}$) of the second interpolymer is less than, or equal to, 250,000 g/mole, further less than, or equal to, 240,000 g/mole, further less than, or equal to, 230,000 g/mole, further less than, or equal to, 220,000 g/mole, further less than, or equal to, 210,000 g/mole, further less than, or equal to, 200,000 g/mole.

In one embodiment, the ratio ($Mn_{first}/Mn_{second}$) of the number average molecular weight ($Mn_{first}$) of the first interpolymer to the number average molecular weight ($Mn_{second}$) of the second interpolymer is from 3.00 to 5.00, further from 3.20 to 4.80, further from 3.40 to 4.50.

In one embodiment, the ratio of "the Mn of the first ethylene/α-olefin interpolymer" to "the Mn of the first composition" is greater than, or equal to, 2.2, further greater than, or equal to, 2.4, further greater than, or equal to, 2.6.

In one embodiment, the first composition has a Mn from 20,000 to 120,000 g/mole, further from 20,000 to 100,000 g/mole, further from 20,000 to 80,000 g/mole.

In one embodiment, the first ethylene/α-olefin interpolymer has a Mw from 250,000 to 500,000 g/mole, further from 280,000 to 500,000 g/mole, further from 300,000 to 500,000 g/mole.

In one embodiment, the difference ($Mw_{first}-Mw_{second}$) in the weight average molecular weight ($Mw_{first}$) of the first interpolymer and the weight average molecular weight ($Mw_{second}$) of the second interpolymer is greater than, or equal to, 100,000 g/mole, further greater than, or equal to, 110,000 g/mole, further greater than, or equal to, 120,000 g/mole, further greater than, or equal to, 130,000 g/mole, further greater than, or equal to, 140,000 g/mole, further is greater than, or equal to, 150,000 g/mole, further greater than, or equal to, 180,000 g/mole, further greater than, or equal to, 200,000 g/mole, further greater than, or equal to, 220,000 g/mole.

In one embodiment, the difference ($Mw_{first}-Mw_{second}$) in the weight average molecular weight ($Mw_{first}$) of the first interpolymer and the weight average molecular weight ($Mw_{second}$) of the second interpolymer is less than, or equal to, 500,000 g/mole, further less than, or equal to, 480,000 g/mole, further less than, or equal to, 450,000 g/mole.

In one embodiment, the ratio ($Mw_{first}/Mw_{second}$) of the weight average molecular weight ($Mw_{first}$) of the first interpolymer to the weight average molecular weight ($Mw_{second}$) of the second interpolymer is from 2.50 to 5.00, further from 2.80 to 4.80, further from 3.00 to 4.50.

In one embodiment, the ratio of "the Mw of the first ethylene/α-olefin interpolymer" to "the Mw of the first composition" is greater than, or equal to, 1.2, further greater than, or equal to, 1.3, further is greater than, or equal to, 1.4, further greater than, or equal to, 1.5, further greater than, or equal to, 1.6.

In one embodiment, the ratio of "the Mw of the first ethylene/α-olefin interpolymer" to "the Mw of the first composition" is less than, or equal to, 3.5, further less than, or equal to, 3.0, further less than, or equal to, 2.5.

In one embodiment, the first composition has a Mw from 100,000 to 250,000 g/mole, further from 120,000 to 230,000 g/mole, further from 150,000 to 210,000 g/mole.

In one embodiment, the first ethylene/α-olefin interpolymer has a MWD from 1.80 to 3.00, further from 1.90 to 2.70, further from 2.00 to 2.50.

In one embodiment, the ratio ($MWD_{first}/MWD_{second}$) of the molecular weight distribution ($MWD_{first}$) of the first interpolymer to molecular weight distribution ($MWD_{second}$) of the second interpolymer is from 0.60 to 1.50, further from 0.70 to 1.30, further from 0.80 to 1.20, further from 0.85 to 1.10.

In one embodiment, the ratio of "the MWD of the first ethylene/α-olefin interpolymer" to "the MWD of the first composition" is from 0.40 to 1.00, further from 0.50 to 0.90, further from 0.60 to 0.80.

In one embodiment, the first composition has a MWD from 2.00 to 4.50, further from 2.50 to 4.00, further from 2.80 to 3.50.

In one embodiment, the first ethylene/α-olefin interpolymer has a C2 content from 60 to 90 weight percent, further from 60 to 85 weight percent, further from 60 to 80 weight percent, based on the total weight of the first interpolymer.

In one embodiment, the weight ratio of "the C2 content of the first ethylene/α-olefin interpolymer" to "the C2 of the first composition" is from 0.90 to 1.20, further from 0.90 to 1.10, further from 0.90 to 1.00.

In one embodiment, the first composition has a C2 content from 60 to 90 weight percent, further from 60 to 85 weight percent, further from 60 to 80 weight percent, based on the total weight of the first interpolymer.

In one embodiment, the first ethylene/α-olefin interpolymer has a polyene content from 2.0 to 6.0 weight percent, further from 2.0 to 5.0 weight percent, further from 2.0 to 4.0 weight percent, based on the weight of the interpolymer. In a further embodiment, the polyene is a diene.

In one embodiment, the weight ratio of "the polyene of the first interpolymer" to "the polyene of the first composition" is from 0.60 to 1.00, further from 0.70 to 1.00, further from 0.80 to 1.00. In a further embodiment, the polyene is a diene.

In one embodiment, the α-olefin of the first ethylene/α-olefin interpolymer is a C3-C8 alpha-olefin.

In one embodiment, the α-olefin of the second ethylene/α-olefin interpolymer is a C3-C8 alpha-olefin.

In one embodiment, the first ethylene/α-olefin interpolymer is selected from an ethylene/propylene copolymer or an EPDM, and further an EPDM.

In one embodiment, the second ethylene/α-olefin interpolymer is selected from an ethylene/propylene copolymer or an EPDM, and further an EPDM.

In one embodiment, both the first and second ethylene/α-olefin interpolymers are each, independently, an EPDM.

In one embodiment, first ethylene/α-olefin interpolymer differs from the second ethylene/α-olefin interpolymer in one or more properties, including, but not limited to Mooney viscosity, Mw, Mn, MWD, rheology ratio, ethylene content, and/or polyene content, and further Mooney viscosity, Mw, Mn, MWD, ethylene content, and/or polyene content.

In one embodiment, the first and second ethylene/α-olefin interpolymers are each, independently, an ethylene/α-olefin/diene interpolymer (EAODM). In a further embodiment, each interpolymer is independently an ethylene/propylene/diene terpolymer (EPDM). In a further embodiment, the diene is 5-ethylidene-2-norbornene (ENB).

In one embodiment, the first composition has a Mooney Viscosity (ML 1+4, 125° C.) greater than, or equal to, 55, further greater than, or equal to, 60, further greater than, or equal to, 65, further greater than, or equal to, 70. Mooney viscosity is that of the neat polymer (no oil, no filler); polymer is typically stabilized with one or more antioxidants and/or other stabilizers.

In one embodiment, the first composition has a Mooney Viscosity (ML 1+4, 125° C.) from 55 to 100, further from 55 to 90, further from 55 to 80.

In one embodiment, the ratio of "the Mooney Viscosity (ML 1+4, 125° C.) of the first ethylene/α-olefin interpolymer" to "the Mooney Viscosity (ML 1+4, 125° C.) of the first composition" is from 1.20 to 2.00, further from 1.20 to 2.00, further from 1.20 to 2.00.

In one embodiment, the first composition comprises greater than, or equal to, 60 wt %, further greater than, or equal to, 70 wt %, further greater than, or equal to, 80 wt % of sum of the first ethylene/α-olefin interpolymer and second ethylene/α-olefin interpolymer, based on the weight of the first composition.

In one embodiment, the first composition comprises greater than, or equal to, 90 wt %, further greater than, or equal to, 95 wt %, further greater than, or equal to, 98 wt %, further greater than, or equal to, 99 wt % of sum of the first ethylene/α-olefin interpolymer and second ethylene/α-olefin interpolymer, based on the weight of the first composition.

The invention also provides a composition formed by an inventive process.

In one embodiment, the composition comprises greater than, or equal to, 60 wt %, further greater than, or equal to, 70 wt %, further greater than, or equal to, 80 wt % of the first composition, based on the weight of the composition. In a further embodiment, the first composition comprises greater than, or equal to, 90 wt %, further greater than, or equal to, 95 wt %, further greater than, or equal to, 98 wt %, further greater than, or equal to, 99 wt % of sum of the first ethylene/α-olefin interpolymer and second ethylene/α-olefin interpolymer, based on the weight of the first composition.

In one embodiment, the composition comprises greater than, or equal to, 90 wt %, further greater than, or equal to, 95 wt %, further greater than, or equal to, 98 wt %, further greater than, or equal to, 99 wt % of the first composition, based on the weight of the composition. In a further embodiment, the first composition comprises greater than, or equal to, 90 wt %, further greater than, or equal to, 95 wt %, further greater than, or equal to, 98 wt %, further greater than, or equal to, 99 wt % of sum of the first ethylene/α-olefin interpolymer and second ethylene/α-olefin interpolymer, based on the weight of the first composition.

In one embodiment, the composition further comprises one or more additives.

In one embodiment, the composition further comprises at least one stabilizer. Suitable stabilizers include, but are not limited to, AO and UV stabilizers.

In one embodiment, the at least one stabilizer is present in an amount from 0.1 to 1.0 weight percent, based on the weight of the composition.

The invention also provides an article comprising at least one component formed from an inventive composition.

In one embodiment, the article is selected from the group consisting of the following: profiles, injection molded parts, gaskets, shoe components, automotive parts, and tubes.

An inventive process may comprise a combination of two or more embodiments described herein.

The first composition may comprise a combination of two or more embodiments described herein.

The first ethylene/α-olefin interpolymer may comprise a combination of two or more embodiments described herein.

The second ethylene/α-olefin interpolymer may comprise a combination of two or more embodiments described herein.

An inventive composition may comprise a combination of two or more embodiments described herein.

An inventive article may comprise a combination of two or more embodiments described herein.

The invention also provides a polymerization reactor configuration comprising at least the following: a stirred tank reactor followed by a loop reactor.

In one embodiment, the loop reactor is connected to the stirred tank reactor by one or more conduits (for example, pipes).

In one embodiment, there is no other reactor located between the stirred tank reactor and the loop reactor.

In one embodiment, the loop reactor operates at a temperature from 50° C. to 250° C., during the polymerization.

In one embodiment, the stirred tank reactor is a continuous stirred tank reactor (CSTR).

An inventive reactor configuration may comprise a combination of two or more embodiments described herein First and Second Ethylene/α-Olefin Interpolymers The ethylene/α-olefin interpolymers (first and second interpolymers), for the first compositions described herein, comprise, in polymerize form, ethylene, an α-olefin, and, optionally, a polyene and further a non-conjugated polyene. Suitable examples of α-olefins include the C3-C20 α-olefins, further C3-C10 α-olefins, and preferably propylene. Suitable examples of nonconjugated polyenes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, each ethylene/α-olefin interpolymer, independently, comprises a majority amount of polymerized ethylene, based on the weight of the interpolymer. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a density from 0.85 to 0.93 g/cc, or from 0.85 to 0.92 g/cc, or from 0.85 to 0.91 g/cc, or from 0.85 to 0.90 g/cc, or from 0.85 to 0.89 g/cc. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB In one embodiment, each ethylene/α-olefin interpolymer has a molecular weight distribution (Mw/Mn) from 1.80 to 3.50, or from 1.90 to 3.00, or from 2.00 to 2.80. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a Mooney viscosity, ML(1+4) at 125° C., greater than, or equal to, 40, or greater than, or equal to, 45, or greater than, or equal to 50, or greater than, or equal to 55. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer is, independently, an ethylene/α-olefin/nonconjugated polyene interpolymer that has a Mooney viscosity, ML(1+4) at 125° C., greater than, or equal to, 40, or greater than, or equal to, 45, or greater than, or equal to 50, or greater than, or equal to 55. In a further embodiment, each interpolymer is, independently, an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a Mooney viscosity, ML(1+4) at 125° C., less than 300, or less than, or equal to, 200, or less than, or equal to, 150. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer is, independently, an ethylene/α-olefin/nonconjugated polyene interpolymer that has a Mooney viscosity, ML(1+4) at 125° C., greater than, or equal to, 40, or greater than, or equal to, 45, or greater than, or equal to 50, or greater than, or equal to 55. In a further embodiment, each ethylene/α-olefin interpolymer is, independently, an ethylene/α-olefin/diene interpolymer. In a further embodiment, each interpolymer is, independently, an EPDM terpolymer. In a further embodiment, the diene is ENB In one embodiment, each ethylene/α-olefin interpolymer has a density from 0.85 to 0.93 g/cc, or from 0.85 to 0.92 g/cc, or from 0.85 to 0.91 g/cc, or from 0.85 to 0.90 g/cc, or from 0.85 to 0.89 g/cc. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, each ethylene/α-olefin interpolymer has a density from 0.86 to 0.93 g/cc, or from 0.86 to 0.92 g/cc, or from 0.86 to 0.91 g/cc, or from 0.86 to 0.90 g/cc, or from 0.86 to 0.89 g/cc. In a further embodiment, each ethylene/α-olefin interpolymer is, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first ethylene/α-olefin interpolymer has a weight average molecular weight (Mw) greater than, or equal to, 250,000 g/mole, further greater than, or equal to 270,000 g/mole, further greater than, or equal to 300,000 g/mole, further greater than, or equal to 320,000 g/mole. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the first ethylene/α-olefin interpolymer has a weight average molecular weight (Mw) less than, or equal to, 700,000 g/mole, further less than, or equal to, 600,000 g/mole, further less than, or equal to, 500,000 g/mole. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the first ethylene/α-olefin interpolymer has a number average molecular weight (Mn) greater than, or equal to, 100,000 g/mole, further greater than, or equal to 120,000 g/mole, further greater than, or equal to 130,000 g/mole. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the first ethylene/α-olefin interpolymer has a number average molecular weight (Mn) less than, or equal to, 250,000 g/mole, further less than, or equal to, 240,000 g/mole, further less than, or equal to, 230,000 g/mole. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the first ethylene/α-olefin interpolymer has a molecular weight distribution (MWD) greater than, or equal to, 1.80, further greater than, or equal to 1.90, further greater than, or equal to 2.00. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the first ethylene/α-olefin interpolymer has a molecular weight distribution (MWD) less than, or equal to, 3.00, further less than, or equal to, 2.70, further less than, or equal to, 2.50. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the first ethylene/α-olefin interpolymer comprises from 60 to 95 weight percent ethylene, further from 62 to 90 weight percent ethylene, and further from 65 to 80 weight percent ethylene, based on the weight of the interpolymer. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

The first ethylene/α-olefin interpolymer may comprise a combination of two or more embodiments as described herein.

In one embodiment, the second ethylene/α-olefin interpolymer has a weight average molecular weight (Mw) greater than, or equal to, 50,000 g/mole, further greater than, or equal to 70,000 g/mole, further greater than, or equal to 90,000 g/mole, further greater than, or equal to 100,000 g/mole. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the second ethylene/α-olefin interpolymer has a weight average molecular weight (Mw) less than, or equal to, 200,000 g/mole, further less than, or equal to, 170,000 g/mole, further less than, or equal to, 150,000 g/mole. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the second ethylene/α-olefin interpolymer has a number average molecular weight (Mn) greater than, or equal to, 20,000 g/mole, further greater than, or equal to 30,000 g/mole, further greater than, or equal to 40,000 g/mole. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the second ethylene/α-olefin interpolymer has a number average molecular weight (Mn) less than, or equal to, 80,000 g/mole, further less than, or equal to, 70,000 g/mole, further less than, or equal to, 60,000 g/mole. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the second ethylene/α-olefin interpolymer has a molecular weight distribution (MWD) greater than, or equal to, 1.80, further greater than, or equal to 1.90, further greater than, or equal to 2.00. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the second ethylene/α-olefin interpolymer has a molecular weight distribution (MWD) less than, or equal to, 3.10, further less than, or equal to, 2.90, further less than, or equal to, 2.70. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is END.

The second ethylene/α-olefin interpolymer may comprise a combination of two or more embodiments as described herein.

First Composition

In one embodiment, the first composition has a Mooney Viscosity (ML 1+4, 125° C.) greater than, or equal to, 50, further greater than, or equal to, 55, further greater than, or equal to, 60. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first composition has a weight average molecular weight (Mw) greater than, or equal to, 100,000 g/mole, further greater than, or equal to, 120,000 g/mole, further greater than, or equal to, 150,000 g/mole. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first composition has a weight average molecular weight (Mw) less than, or equal to, 250,000 g/mole, further less than, or equal to 240,000 g/mole, further less than, or equal to 230,000 g/mole. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first composition has a number average molecular weight (Mn) greater than, or equal to, 30,000 g/mole, further greater than, or equal to, 40,000 g/mole, further greater than, or equal to, 50,000 g/mole. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first composition has a number average molecular weight (Mn) less than, or equal to, 100,000 g/mole, further less than, or equal to, 90,000 g/mole, further less than, or equal to, 80,000 g/mole. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first composition has a molecular weight distribution (MWD) greater than, or equal to, 2.6, further greater than, or equal to 2,8, further greater than, or equal to 3.0. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first composition has a molecular weight distribution (MWD) less than, or equal to, 4.5, further less than, or equal to, 4.0, further less than, or equal to, 3.5. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first composition comprises greater than, or equal to, 60 wt %, further greater than, or equal to, 70 wt %, further greater than, or equal to, 80 wt % of sum of the first ethylene/α-olefin interpolymer and second ethylene/α-olefin interpolymer, based on the weight of the first composition. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first composition comprises greater than, or equal to, 90 wt %, further greater than, or equal to, 95 wt %, further greater than, or equal to, 98 wt %, further greater than, or equal to, 99 wt % of sum of the first ethylene/α-olefin interpolymer and second ethylene/α-olefin interpolymer, based on the weight of the first composition. In a further embodiment, the first ethylene/α-olefin interpolymer and the second ethylene/α-olefin interpolymer are each, independently, an ethylene/α-olefin/polyene interpolymer, and further an ethylene/α-olefin/diene interpolymer. In a further embodiment, each interpolymer is, independently, an EPDM terpolymer. In a further embodiment, the diene is ENB.

In one embodiment, the first ethylene/α-olefin interpolymer is present in an amount greater than, or equal to, 15 weight percent, further greater than, or equal to, 20 weight percent, and further greater than, or equal to, 25 weight percent, based on the weight of the first composition. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the first ethylene/α-olefin interpolymer is present in an amount less than, or equal to, 50 weight percent, further less than, or equal to, 45 weight percent, and further less than, or equal to, 40 weight percent, based on the weight of the first composition. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the first ethylene/α-olefin interpolymer is present in an amount greater than, or equal to, 15 weight percent, further greater than, or equal to, 20 weight percent, and further greater than, or equal to, 25 weight percent, based on the weight of the first interpolymer and second interpolymer. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the first ethylene/α-olefin interpolymer is present in an amount less than, or equal to, 50 weight percent, further less than, or equal to, 45 weight percent, and further less than, or equal to, 40 weight percent, based on the weight of the first interpolymer and the second interpolymer. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB.

In one embodiment, the second ethylene/α-olefin interpolymer is present in an amount greater than, or equal to, 50 weight percent, further greater than, or equal to, 55 weight percent, and further greater than, or equal to, 60 weight percent, based on the weight of the first composition. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the second ethylene/α-olefin interpolymer is present in an amount less than, or equal to, 85 weight percent, further less than, or equal to, 80 weight percent, and further less than, or equal to, 75 weight percent, based on the weight of the first composition. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the second ethylene/α-olefin interpolymer is present in an amount greater than, or equal to, 50 weight percent, further greater than, or equal to, 55 weight percent, and further greater than, or equal to, 60 weight percent, based on the weight of the first interpolymer and second interpolymer. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

In one embodiment, the second ethylene/α-olefin interpolymer is present in an amount less than, or equal to, 85 weight percent, further less than, or equal to, 80 weight percent, and further less than, or equal to, 75 weight percent, based on the weight of the first interpolymer and the second interpolymer. In a further embodiment, the second ethylene/α-olefin interpolymer is an ethylene/α-olefin/polyene interpolymer, and further an ethylene/α-olefin/diene interpolymer. In a further embodiment, the second interpolymer is an EPDM terpolymer. In a further embodiment, the diene is ENB. In a further embodiment, the first ethylene/α-olefin interpolymer is an ethylene/α-olefin/polyene interpolymer, and further an ethylene/α-olefin/diene interpolymer. In a further embodiment, the first interpolymer is an EPDM terpolymer. In a further embodiment, the diene is ENB.

The first composition may comprise a combination of two or more embodiments as described herein.

Additives

An inventive composition may comprise one or more additional additives. Suitable additives include, but are not limited to, fillers, antioxidants, UV stabilizers, crosslinking agents, flame retardants, foaming agents, colorants or pigments, oils, and combinations thereof.

Some antioxidants include, but are not limited to, hindered phenols, bisphenols, and thiobisphenols; and substituted hydroquinones.

Fillers include, but are not limited to, silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and the like.

Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like. In one embodiment, the oil is selected from the group consisting of nonaromatic oils, paraffinic oils, naphthenic oils, and combinations thereof. Suitable oils include, but are not limited to, PARALUX 6001, HYDROBRITE 1000, HYDROBRITE 550, and CALSOL In one embodiment, the oil is present in an amount from 5 to 70 weight percent, further from 5 to 50 weight percent, based on the weight of the composition.

Applications

The compositions of the present invention may be used to prepare a variety of articles, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes.

Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

Definitions

Unless stated to the contrary, implicit from the context, or customary in the art, all parts and percents are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, may be incorporated into and/or within a polymer.

The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, typically refers to a polymer that comprises, in polymerized form, a majority weight percent of ethylene (based on the weight of the polymer), and optionally may comprise one or more comonomers. However, when the ethylene-based polymer is an ethylene/α-olefin/polyene interpolymer, or an ethylene/α-olefin/diene interpolymer, the amount of polymerized ethylene may range from 40 wt % to a majority wt %, based on the weight of the polymer. In one embodiment, ethylene-based polymer," comprises, in polymerized form, a majority weight percent of ethylene (based on the weight of the polymer), and optionally may comprise one or more comonomers.

The term "ethylene/α-olefin interpolymer," as used herein, typically refers to a polymer that comprises, in polymerized form, a majority weight percent of ethylene (based on the weight of the interpolymer), and at least one α-olefin. However, when the ethylene/α-olefin interpolymer is an ethylene/α-olefin/polyene interpolymer, or an ethylene/α-olefin/diene interpolymer, the amount of polymerized ethylene may range from 40 wt % to a majority wt %, based on the weight of the interpolymer. In one embodiment, ethylene/α-olefin interpolymer," comprises, in polymerized form, a majority weight percent of ethylene (based on the weight of the interpolymer), and at least one α-olefin.

The term "ethylene/α-olefin/polyene interpolymer" as used herein, refers to a polymer that comprises, in polymerized form, ethylene, an α-olefin, and a polyene. In one embodiment, the "ethylene/α-olefin/polyene interpolymer" comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term "ethylene/α-olefin/diene terpolymer," as used herein, refers to a polymer that comprises, in polymerized form, ethylene, an α-olefin, and a diene, as the only three monomer types. In one embodiment, the "ethylene/α-olefin/diene terpolymer" comprises a majority weight percent of ethylene (based on the weight of the terpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term, "propylene/α-olefin copolymer," as used herein, refers to a copolymer that comprises, in polymerized form, a majority amount of propylene monomer (based on the weight of the copolymer), and an α-olefin, as the only two monomer types.

The term, "propylene/ethylene copolymer," as used herein, refers to a copolymer that comprises, in polymerized form, a majority amount of propylene monomer (based on the weight of the copolymer), and ethylene, as the only two monomer types.

The term "mixture," as used herein, in reference to a polymerization process, refers to a composition comprising components of the polymerization (for example, monomer, comonomer(s), solvent, etc.).

The term "polyene," as used herein, in reference to a comonomer of a polymerization process, refers to a comonomer comprising at least two carbon-carbon double bonds.

The term "stirred tank reactor," is known in the art, and typically refers to a pressure reactor vessel containing one or more rotating agitators, and/or one or more impellers, on a central agitator shaft, and which are used to mix the reactor contents. Typically, one or more feed streams introduce the reactants into the reactor, and an exit stream is used to withdraw the reactor effluent. Typically, one or more baffles are often installed on the wall of the reactor to improve the quality of mixing. Stirred tank reactors are often jacketed, to allow limited addition or removal of heat, but the amount of heat transfer area is small relative to other reactor designs, and thus, liquid full, stirred tank reactors operate principally adiabatically, particularly at a large industrial scale. Some stirred tank reactors may contain cooling coils (for example, see U.S. Pat. No. 2,875,027) to aid in the remove of the heat of polymerization. Others may be operated with a gas phase containing a condensable vapor, and use condensation to remove heat (see, for example, U.S. Pat. No. 3,968,090).

The term "loop reactor," as used herein, refers to a reactor that comprises a flow loop configuration. Some loop reactors for solution polymerization are well described in U.S. Pat. No. 5,977,251. These reactors are typically characterized by a recycling flow loop, where a pump is used to motivate flow of the polymerization solution through one or more heat exchangers, which remove the heat of polymerization, and also through static and/or dynamic mixing elements, which help homogenize the polymerization solution. Typically, solvent and monomer feeds are introduced at one or more points within the loop, using various types of feed injectors. Typically, one or more catalyst components are introduced, in a similar fashion, via one or more catalyst injectors. Static mixers are frequently used downstream of each feed or catalyst injector, to improve mixing of these feed streams into the bulk fluid. At some point, within the loop an exit stream removes the reactor effluent which is sent, in turn, to subsequent reactors, or to the devolatilization section of the isolation process.

The term "solution polymerization," as used herein, refers to a polymerization process, in which the formed polymer is dissolved in the polymerization solvent.

The term "continuous solution polymerization," as used herein refers to a solution polymerization, in which monomer, solvent, and catalyst feeds are continually added to a reactor (for example, stirred tank, loop, pipe flow, etc.). Reactor effluent comprising polymer, solvent, catalysts and unreacted monomers is continually removed from the reactor. By dividing the volume of the reactor, by the average volumetric flow rate through the reactor, one can calculate the residence time, which is the average time a discrete quantity of reactor feed spends inside the reactor. Continuous solution polymerization is distinct from batch polymerization, where the feeds are introduced prior to polymerization, and the reactor contents are removed at or near the end of polymerization. Semi-batch polymerization is similar to batch polymerization, but some feeds of monomer or catalyst may be continually added during the course of polymerization, while the reactor contents are again removed at or near the end of the polymerization.

The term "polymer solution," as used herein, refers to the complete dissolution of polymer in one or more solvents (typically much lower in molecular weight than polymer) to form a homogeneous (most often in liquid state) phase. The solution comprises the polymer and solvent, and may also comprise unreacted monomers and other residuals of the polymerization reaction.

The term "solvent," as used herein, refers to a substance (for example, a hydrocarbon or a mixture of two or more hydrocarbons (excluding monomer and comonomer)) that dissolves a species of interest, like a monomer and/or polymer, resulting in a liquid phase.

The term "adiabatic reactor," as used herein, refers to a reactor which has no active heat removal mechanism and no active heat addition mechanism.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Mooney Viscosity

The Mooney viscosity (ML1+4 at 125° C.) of the ethylene/α-olefin interpolymer (e.g., EPDM with no filler and no oil) is measured in accordance with ASTM 1646, with a one minute preheat time and a four minute rotor operation time. The instrument is an Alpha Technologies Rheometer MDR 2000.

For dual reactor polymerizations in series, as described herein, the Mooney viscosity of the second reactor component is determined by the following equation: log ML=n(A) log ML(A)+n(B) log ML(B); where ML is the Mooney viscosity of the final reactor product, ML(A) is the Mooney viscosity of the first reactor polymer, ML(B) is the Mooney viscosity of the second reactor polymer, n(A) is the weight fraction of the first reactor polymer, and n(B) is the weight fraction of the second reactor polymer. Each measured Mooney viscosity is measured as discussed above. The weight fraction of the second reactor interpolymer is determined as follows: n(B)=1-n(A), where n(A) is determined by the known mass of first polymer transferred to the second reactor.

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene}=A \times (M_{polystyrene})^B$, where M is the molecular weight, A has a value of 0.431 and B is equal to 1.0 (as described in Williams and Ward, J. Polym. Sc., Polym. Let., 6, 621 (1968)). Polyethylene equivalent molecular weight calculations were performed using Viscotek TriSEC software Version 3.0.

FTIR Method for EPDM Composition Analysis

The terpolymers containing ethylene, propylene, and 5-ethylidene-2-norbornene were analyzed using ASTM D9300 for its ethylene content, and ASTM D6047 for its ethylidene-norbornene (ENB).

Melt Index

Melt index (I2, or MI) of an ethylene-based polymer is measured in accordance with ASTM D-1238, condition 190° C./2.16 kg.

Density

Density is measured in accordance with ASTM D-792.

Differential Scanning Calorimetry

Differential Scanning calorimetry (DSC) is used to measure crystallinity in ethylene (PE) based polymer samples and propylene (PP) based polymer samples. About five to eight milligrams of sample is weighed, and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 292 J/g for PE (165 J/g, for PP), and multiplying this quantity by 100 (e.g., for PE, % cryst.=(Hf/292 J/g)×100; and for PP, % cryst.=(Hf/165 J/g)×100).

Unless otherwise stated, melting point(s) ($T_m$) of each polymer is determined from the second heat curve obtained from DSC, as described above (peak $T_m$). The crystallization temperature ($T_c$) is determined from the first cooling curve (peak $T_c$).

EXPERIMENTAL

Reagents

All solvents and monomers are first purified using adsorption beds to remove potential catalyst poisons.

The solvents used is ISOPAR E.

(CAT A)

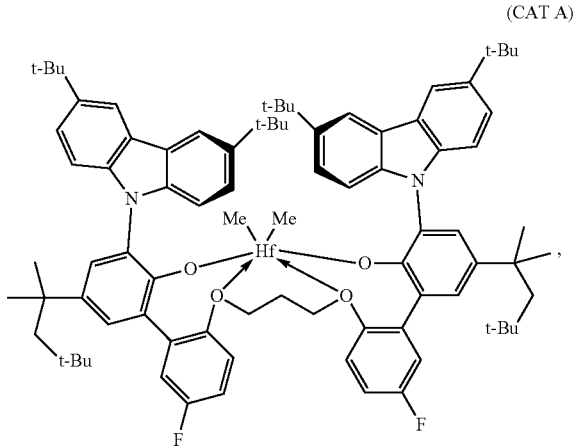

CAT A=Hafnium, dimethyl[[2',2'''-[1,3-propanediylbis(oxy-.kappa.O)]bis[3-[3,6-bis(1,1-dimethylethyl)-9H-carbazol-9-yl]-5'-fluoro-5-(1,1,3,3-tetramethylbutyl) [1,1'-biphenyl]-2-olato-.kappa.O]](2-)]-, (OC-6-33)-.

(CAT B)

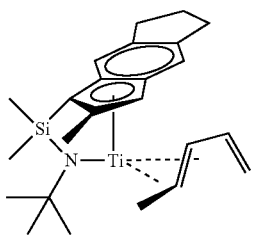

(CAT C)

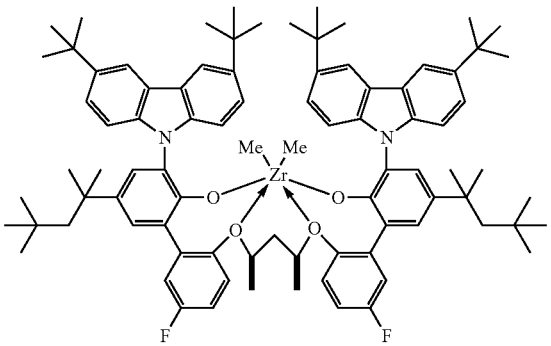

Cocatalysts
Cocat 1: (bis-hydrogenatedtallowalkylmethylammonium tetrakis-pentafluorophenylborate)—Supplied by Boulder Scientific.
Cocat 2: (modified methaluminoxane) (MMAO-3A)—Supplied by Akzo-Nobel.
Cocat 3: (tris-pentafluorophenyl borane)—Supplied by Boulder Scientific.
Polymerizations Inventive Examples 1 and 2: CSTR-Loop Polymerizations This reactor configuration is depicted in FIG. 1. The reactive monomers, ethylene, propylene, and ENB, along with solvent (ISOPAR E) and hydrogen, were fed through a feed cooler to a jacketed and stirred continuous tank reactor (CSTR). Three catalyst components (catalyst, cocatalyst(s)) were fed to the CSTR, separately from the other feeds. The outlet of the CSTR was sent to a loop reactor, along with additional chilled solvent (ISOPAR E), ethylene, propylene, ENB, and hydrogen. The temperature within the loop reactor was controlled using heat exchangers within the loop. Three catalyst components (catalyst, cocatalyst(s)) were fed to the loop reactor, separately from the other feeds. The outlet stream of the loop reactor was forwarded to the devolatilization section of the plant where the polymer was recovered from the solvent and unreacted monomers. Process conditions are shown in Tables 1A, 1B, 2A and 2B below.

Comparative Examples A-G: Loop-Loop Polymerizations

Figure 2:
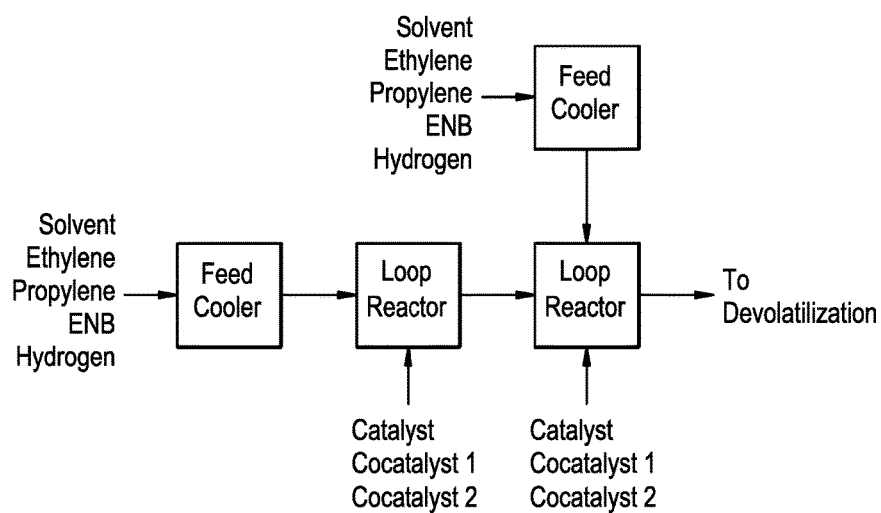
FIG. 2 depicts a polymerization scheme containing a Loop-Loop reactor configuration.

This reactor configuration is depicted in FIG. 2. The reactive monomers, ethylene, propylene, and ENB, along with solvent (ISOPAR E) and hydrogen, were fed to a loop reactor, through a feed cooler. Three catalyst components (catalyst, cocatalyst(s)) were fed to the loop reactor, separately from the other feeds. The outlet of the loop reactor was sent to a second loop reactor, along with additional chilled solvent (ISOPAR E), ethylene, propylene, ENB, and hydrogen. Three catalyst components (catalyst, cocatalyst(s)) were fed to the second loop reactor, separately from the other feeds. The outlet stream of the second loop reactor was forwarded to the devolatilization section of the plant where the polymer was recovered from the solvent and unreacted monomers. Process conditions are shown in Tables 1A, 1B, 2A and 2B below. Polymer properties are shown in Tables 3, 4 and 5. Properties measured on isolated polymer from first reactor and polymer composition from second reactor.

TABLE 1A

| | | First Reactor = R1 = a | | | |
|---|---|---|---|---|---|
| Ex. | CAT/ Cocat | Reactor Temp. [° C.] | Reactor Pressure [psig] | H2/C2 Feed Ratio [mol/mol *100] | C3/C2 Feed Ratio [kg/kg] | ENB/C2 Feed Ratio [kg/kg] |

| Ex. | CAT/ Cocat | Reactor Temp. [° C.] | Reactor Pressure [psig] | H2/C2 Feed Ratio [mol/mol *100] | C3/C2 Feed Ratio [kg/kg] | ENB/C2 Feed Ratio [kg/kg] |
|---|---|---|---|---|---|---|
| 1 | CAT A Cocat 1 Cocat 2 | 103 | 659 | 0.64 | 0.816 | 0.0890 |
| 2 | CAT C Cocat 1 Cocat 2 | 106 | 696 | 0.03 | 0.694 | 0.1840 |
| A | CAT B Cocat 3 Cocat 2 | 88 | 650 | 0.2100 | 0.800 | 0.111 |
| B | CAT B Cocat 3 Cocat 2 | 90 | 650 | 0.1600 | 1.198 | 0.180 |
| C | CAT B Cocat 3 Cocat 2 | 83 | 650 | 0.070 | 1.418 | 0.318 |
| D | CAT B Cocat 3 Cocat 2 | 120 | 650 | 0.0001 | 0.48 | 0.011 |
| E | CAT B Cocat 3 Cocat 2 | 83 | 650 | 0.140 | 1.47 | 0.198 |
| F | CAT B Cocat 3 Cocat 2 | 88 | 650 | 0.0600 | 1.06 | 0.1460 |
| G | CAT A Cocat 1 Cocat 2 | 115 | 650 | 0.149 | 1.54 | 0.183 |

H2 = Hydrogen;
C2 = Ethylene;
C3 = Propylene

TABLE 1B

| | First Reactor = R1 = a | | | | | |
|---|---|---|---|---|---|---|
| Ex. | Catalyst Efficiency [kg polymer/ kg metal] | Cocat 1/ CAT [mol/mol] | Cocat 3/ CAT [mol/mol] | Cocat 2/ CAT [mol/mol] | C2 conversion [%] | Polymer Conc.* [wt %] | Reactor Viscosity** [cP] |
| 1 | 1.06E+06 | 2.0 | | 35.0 | 58.5 | 7.2 | 6700 |
| 2 | 7.31E+06 | 2.2 | | 48.5 | 57.9 | 6.8 | 12600 |
| A | 1.30E+06 | | 4.0 | 10.5 | 74.3 | 9.5 | 1500 |
| B | 1.05E+06 | | 4.0 | 9.5 | 68.8 | 10.6 | 3000 |
| C | 8.50E+05 | | 4.2 | 9.7 | 66.5 | 9.1 | 2100 |
| D | 5.10E+05 | | 2.9 | 4.0 | 90.3 | 11.3 | 500 |
| E | 1.04E+06 | | 4.0 | 11.4 | 68.5 | 11.3 | 4400 |
| F | 1.06E+06 | | 4.0 | 10.7 | 76.7 | 9.7 | 1900 |
| G | 7.60E+05 | 2.4 | | 40.8 | 69.7 | 12.1 | 2900 |

*Polymer concentration = production rate of polymer/reactor through-put; wt % based on the total weight of the reactor content.
**At reactor temperature, measure pressure drop across a flow meter; in-situ device; for example, Brookfield process viscometers, for example, a Brookfield PV-100.

TABLE 2A

| | Loop Reactor (Second Reactor = R2 = b) | | | | | | |
|---|---|---|---|---|---|---|---|
| Ex. | CAT/ Cocat | Reactor Temp. [° C.] | Pressure [psig] | H2/C2 Feed Ratio [mol/mol × 100] | C3/C2 Feed Ratio [kg/kg] | ENB/C2 Feed Ratio [kg/kg] | Reactor Split [wt %]* | Wt % of second interpolymer |
| 1 | CAT A Cocat 1 Cocat 2 | 159 | 625 | 4.3 | 0.979 | 0.0330 | 36.3 | 63.7 |
| 2 | CAT C Cocat 1 Cocat 2 | 140 | 625 | 0.2 | 0.534 | 0.0780 | 27.6 | 72.4 |
| A | CAT B Cocat 3 Cocat 2 | 108 | 650 | 0.330 | 0.405 | 0.133 | 45.0 | 55.0 |
| B | CAT B Cocat 3 Cocat 2 | 122 | 650 | 0.22 | 1.24 | 0.163 | 41.0 | 59.0 |
| C | CAT B Cocat 3 Cocat 2 | 103 | 650 | 0.500 | 1.562 | 0.289 | 45.0 | 55.0 |
| D | CAT B Cocat 3 Cocat 2 | 137 | 650 | 0.450 | 0.68 | 0.020 | 55.0 | 45.0 |

TABLE 2A-continued

Loop Reactor (Second Reactor = R2 = b)

| Ex. | CAT/ Cocat | Reactor Temp. [° C.] | Pressure [psig] | H2/C2 Feed Ratio [mol/mol × 100] | C3/C2 Feed Ratio [kg/kg] | ENB/C2 Feed Ratio [kg/kg] | Reactor Split [wt %]* | Wt % of second interpolymer |
|---|---|---|---|---|---|---|---|---|
| E | CAT B Cocat 3 Cocat 2 | 103 | 650 | 0.260 | 1.24 | 0.180 | 45.0 | 55.0 |
| F | CAT B Cocat 3 Cocat 2 | 125 | 650 | 0.190 | 0.450 | 0.0970 | 37.0 | 63.0 |
| G | CAT A Cocat 1 Cocat 2 | 145 | 650 | 0.422 | 1.75 | 0.108 | 44.0 | 56.0 |

H2 = Hydrogen;
C2 = Ethylene;
C3 = Propylene
Reactor Split = weight percent of first interpolymer, based on the sum weight of the first interpolymer and second interpolymer.

TABLE 2B

Loop Reactor (Second Reactor = R2 = b)

| Ex. | Catalyst Efficiency [kg polymer/ kg metal] | Cocat 1/ CAT [mol/mol] | Cocat 3/ CAT [mol/mol] | Cocat 2/ CAT [mol/mol] | C2 conversion [%] | Polymer Conc.* [wt %] | Reactor Viscosity** [cP] |
|---|---|---|---|---|---|---|---|
| 1 | 1.73E+06 | 2.0 | | 34.9 | 80.7 | 13.2 | 700 |
| 2 | 5.38E+05 | 2.0 | | 65.0 | 81.5 | 13.6 | 2500 |
| A | 1.63E+06 | | 3.5 | 3.5 | 81.2 | 14.0 | 3600 |
| B | 1.24E+06 | | 3.5 | 3.5 | 83.9 | 18.5 | 2000 |
| C | 1.75E+06 | | 3.7 | 3.5 | 78.5 | 14.5 | 1700 |
| D | 1.69E+06 | | 3.5 | 3.5 | 86.5 | 15.8 | 400 |
| E | 1.99E+06 | | 3.5 | 3.5 | 83.0 | 16.9 | 3900 |
| F | 1.20E+06 | | 3.5 | 3.5 | 83.7 | 15.8 | 2500 |
| G | 2.09E+06 | 3.5 | | 41.2 | 81.8 | 15.8 | 1200 |

*Polymer concentration = production rate of polymer/reactor through-put; wt % based on the total weight of the reactor content.
**At reactor temperature, measure pressure drop across a flow meter; in-situ device; for example, Brookfield process viscometers, for example, a Brookfield PV-100.

TABLE 3

Polymer Properties (First Ethylene/alpha-olefin Interpolymer) of First Reactor

| Ex. | 1a | 2a | Aa | Ba | Ca | Da | Ea | Fa | Ga |
|---|---|---|---|---|---|---|---|---|---|
| Reactor Type | CSTR | CSTR | Loop | Loop | Loop | Loop | Loop | Loop | Loop |
| Mw (g/mol) | 341,116 | 448,508 | 189,750 | 194,880 | 262,500 | 128,700 | 200,510 | 199,700 | 221,363 |
| Mn (g/mol) | 147,160 | 220,397 | 91,180 | 84,620 | 108,130 | 46,250 | 84,050 | 83,540 | 89,698 |
| Mw/Mn | 2.32 | 2.04 | 2.08 | 2.30 | 2.43 | 2.78 | 2.39 | 2.39 | 2.47 |
| wt % Ethylene* | 67.6 | 72.0 | 65.4 | n/a | n/a | n/a | n/a | 55.4 | n/a |
| wt % ENB* | 2.27 | 3.98 | n/a | n/a | n/a | n/a | n/a | n/a | n/a |
| Mooney [ML 1 + 4, at 125° C.] | n/a | n/a | n/a | n/a | n/a | 42.8 | n/a | n/a | n/a |
| Fraction of Total Product [wt %] | 36.3 | 27.6 | 45.0 | 41.0 | 45.0 | 55.0 | 45.0 | 37.0 | 44.0 | n/a = not available.
*Based on total weight of polymer.

TABLE 4

Polymer Properties (First Composition) of Overall Polymer

| Ex. | 1b | 2b | Ab | Bb | Cb | Db | Eb | Fb | Gb |
|---|---|---|---|---|---|---|---|---|---|
| Reactor Type | Loop | Loop | Loop | Loop | Loop | Loop | Loop | Loop | Loop |
| Mw (g/mol) | 193,053 | 199,803 | 169,730 | 135,170 | 187,060 | 91,560 | 177,060 | 157,380 | 194,788 |
| Mn (g/mol) | 56,087 | 65,833 | 72,840 | 50,160 | 61,990 | 33,020 | 74,250 | 61,030 | 76,607 |
| Mw/Mn | 3.44 | 3.03 | 2.33 | 2.69 | 3.02 | 2.77 | 2.38 | 2.58 | 2.54 |
| wt % Ethylene* | 67.7 | 72.0 | 69 | 54.9 | 49.5 | 70.8 | 49.8 | 67.6 | 50.04 |
| wt % ENB* | 2.33 | 4.82 | 4.86 | 5.01 | 7.5 | 0.46 | 4.97 | 4.82 | 4.99 |
| Mooney [ML 1 + 4, at 125° C.] | 70 | 68 | 85 | 40.4 | 65.3 | 18.4 | 68.8 | 60.8 | 73.4 |

*Based on total weight of polymer.

TABLE 5

Polymer Properties

| Ex. | 1 | 2 | A | B | C | D | E | F | G |
|---|---|---|---|---|---|---|---|---|---|
| Reactor Type | CSTR-Loop | CSTR-Loop | Loop-Loop | Loop-Loop- | Loop-Loop | Loop-Loop | Loop-Loop | Loop-Loop | Loop-Loop |
| Final Polymer Conc. In second reactor (wt %)* | 13.2 | 13.6 | 14.0 | 18.5 | 14.5 | 15.8 | 16.9 | 15.8 | 15.8 |
| Mw (1st Reactor; first interpolymer = Mw1) g/mole | 341,116 | 448,508 | 189,750 | 194,880 | 262,500 | 128,700 | 200,510 | 199,700 | 221,363 |
| Overall Mw of Final (=Mw) g/mole | 193,053 | 199,803 | 169,730 | 135,170 | 187,060 | 91,560 | 177,060 | 157,380 | 194,788 |
| Calculated Mw of second interpolymer produced in 2nd Reactor (=Mw2)** g/mole | 108,678 | 104,993 | 153,350 | 93,677 | 125,336 | 46,167 | 157,874 | 132,525 | 173,908 |
| Mw (first interpolymer) - Mw (second interpolymer) g/mole | 232,438 | 343,515 | 36,400 | 101,203 | 137,164 | 82,533 | 42,636 | 67,175 | 47,455 |
| Mw (first interpolymer)/ Mw (second interpolymer) g/mole | 3.14 | 4.27 | 1.24 | 2.08 | 2.09 | 2.79 | 1.27 | 1.51 | 1.27 |
| Calculated Mn of second interpolymer produced in 2nd Reactor (=Mn2)** g/mole | 41,464 | 51,946 | 62,547 | 39,096 | 45,948 | 24,466 | 67,784 | 52,692 | 68,726 |
| Calculated MWD of second interpolymer produced in 2nd Reactor (=Mw2/Mn2) | 2.62 | 2.02 | 2.45 | 2.40 | 2.73 | 1.89 | 2.33 | 2.52 | 2.53 |
| Split [wt % first interpolymer] | 36.3 | 27.6 | 45.0 | 41.0 | 45.0 | 55.0 | 45.0 | 37.0 | 44.0 |

*Wt % based on total weight of reactor content.
**1/Mn = split/Mn1 + (1 − split)/Mn2; Mw = split * Mw1 + (1 − split) * Mw2; wherein Mn = overall (first composition) number average molecular weight, Mn1 = number average molecular weight for the first interpolymer, Mn2 = number average molecular weight for the second interpolymer, Mw = overall (first composition) weight average molecular weight, Mw1 = weight average molecular weight of the first interpolymer, Mw2 = weight average molecular weight of the second interpolymer.

Figure 3:
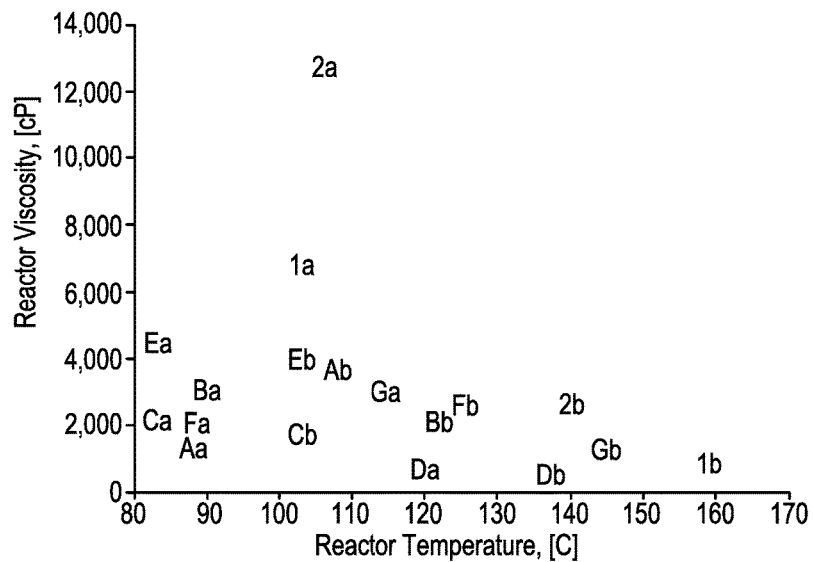
FIG. 3 depicts the Solution (Reactor) Viscosity versus Reactor Temperature for the Inventive and Comparative Polymerizations (a=first reactor; b=second reactor).
Figure 4:
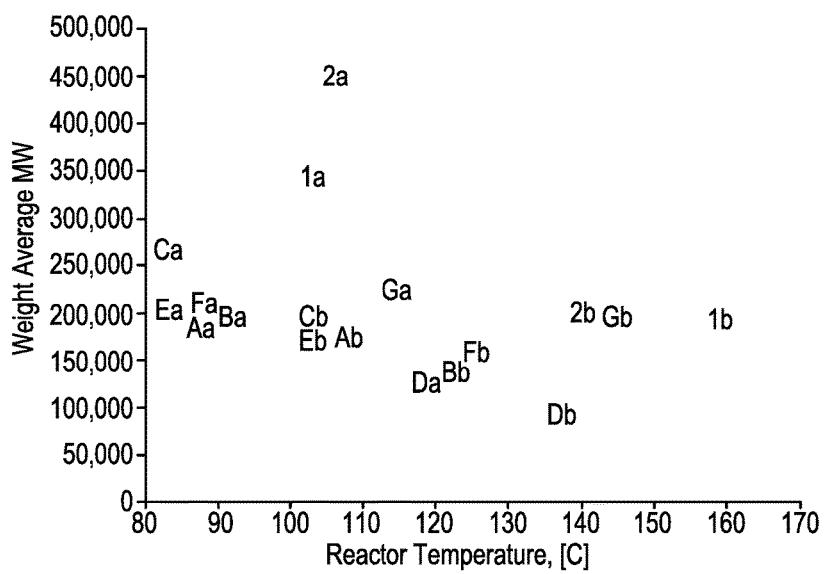
FIG. 4 depicts the Molecular Weight (Mw) versus Reactor Temperature for the Inventive and Comparative Polymerizations (a=first reactor; b=second reactor).

A solution polymerization process is normally operated at the highest polymer concentration attainable. A plant that has higher polymer concentration capability is generally advantaged, because of lower operating costs for polymer devolatization, solvent supply and solvent recycle systems. It has been discovered that the inventive polymerizations result in a larger difference in molecular weight between the polymers produced in each reactor, while using comparable amount of solvent required for the entire polymerization, as indicated by the final polymer concentration in the second reactor (see Table 5; note polymer solution from first reactor is transferred to the second reactor). Also, it has been discovered that very high reactor viscosities can be operated in the stirred tank reactor. See also FIGS. 3 and 4, which show that a significantly higher reactor viscosity and a significantly higher molecular weight (Mw) in the first reactor can be achieved by the inventive polymerization process. Also, it has been discovered that the inventive process provides operational economy, since the use of two stirred-tank reactor would require the use of more solvent, since it is incapable of heat removal, and the use of two loop reactors would result in viscosity and molecular weight limitations. Therefore, the inventive process is beneficial for producing polymers with a very high molecular weight component (for example, Mw) from the first reactor, and with a large molecular weight (for example, Mw) difference between the first and second polymer components. These properties, in turn, impart product advantages like improved melt strength, and improved processibility for blend formulations and final articles. The inventive processes also require a significantly lower amount of total process solvent, and thus, the operation cost is lower, as compared to a Loop-Loop (first loop will required additional solvent to form a high molecular polymer (e.g., Mw>300,000 g/mole)), CSTR-CSTR, or Loop-CSTR reactor configuration alternatives.

The invention claimed is:

1. A process to form a "first composition comprising a first ethylene/α-olefin interpolymer and a second ethylene/α-olefin interpolymer,"
    said process comprising polymerizing via solution polymerization a first mixture comprising ethylene, an α-olefin, and optionally a polyene, in a continuous stirred tank reactor to form a first ethylene/α-olefin interpolymer, and
    transferring at least some of the first ethylene/α-olefin interpolymer to a loop reactor, and polymerizing via solution polymerization, therein, a second mixture comprising ethylene, an alpha-olefin, and optionally a polyene, in the presence of the first ethylene/α-olefin interpolymer, to form the "first composition comprising the first ethylene/α-olefin interpolymer and the second ethylene/α-olefin interpolymer",
    wherein the ratio of "the solution viscosity of the first ethylene/α-olefin interpolymer, in the stirred tank reactor, at the stirred tank reactor temperature" to "the solution viscosity of the first composition, in the loop reactor, at the loop reactor temperature" is greater than, or equal to, 3.0.

2. The process of claim 1, wherein the reactor temperature of the stirred tank reactor is from 80° C. to 130° C.

3. The process of claim 1, wherein the ratio of "the reactor temperature of the continuous stirred tank reactor" to "the reactor temperature of the loop reactor" is from 0.50 to 1.00° C./° C.

4. The process of claim 1, wherein the difference ($Mw_{first}-Mw_{second}$) in the weight average molecular weight ($Mw_{first}$) of the first ethylene/α-olefin interpolymer and the weight average molecular weight ($Mw_{second}$) of the second ethylene/α-olefin interpolymer is greater than, or equal to, 150,000 g/mole.

5. A process to form a "first composition comprising a first ethylene/α-olefin interpolymer and a second ethylene/α-olefin interpolymer,"
    said process comprising polymerizing a first mixture comprising ethylene, an α-olefin, and optionally a polyene, in a stirred tank reactor to form a first ethylene/α-olefin interpolymer, and
    transferring at least some of the first ethylene/α-olefin interpolymer to a loop reactor, and polymerizing, therein, a second mixture comprising ethylene, an alpha-olefin, and optionally a polyene, in the presence of the first ethylene/α-olefin interpolymer, to form the "first composition comprising the first ethylene/α-olefin interpolymer and the second ethylene/α-olefin interpolymer",
    wherein the difference ($Mw_{first}-Mw_{second}$) in the weight average molecular weight ($Mw_{first}$) of the first ethylene/α-olefin interpolymer and the weight average molecular weight ($Mw_{second}$) of the second ethylene/α-olefin interpolymer is greater than, or equal to, 150,000 g/mole.

6. The process of claim 5, wherein the stirred tank reactor is a continuous stirred tank reactor (CSTR).

7. The process of claim 5, wherein the polymerization of the first mixture is a solution polymerization.

8. The process of claim 5, wherein the polymerization of the second mixture is a solution polymerization.

9. The process of claim 5, wherein the ratio of "the solution viscosity of the first ethylene/α-olefin interpolymer, in the stirred tank reactor, at the stirred tank reactor temperature" to "the solution viscosity of the first composition, in the loop reactor, at the loop reactor temperature" is greater than, or equal to, 3.0.

10. The process of claim 6, wherein the reactor temperature of the continuous stirred tank reactor is from 80° C. to 130° C.

11. The process of claim 6, wherein the ratio of "the reactor temperature of the continuous stirred tank reactor" to "the reactor temperature of the loop reactor" is from 0.50 to 1.00° C./° C.

* * * * *